United States Patent Office 3,083,733
Patented Apr. 2, 1963

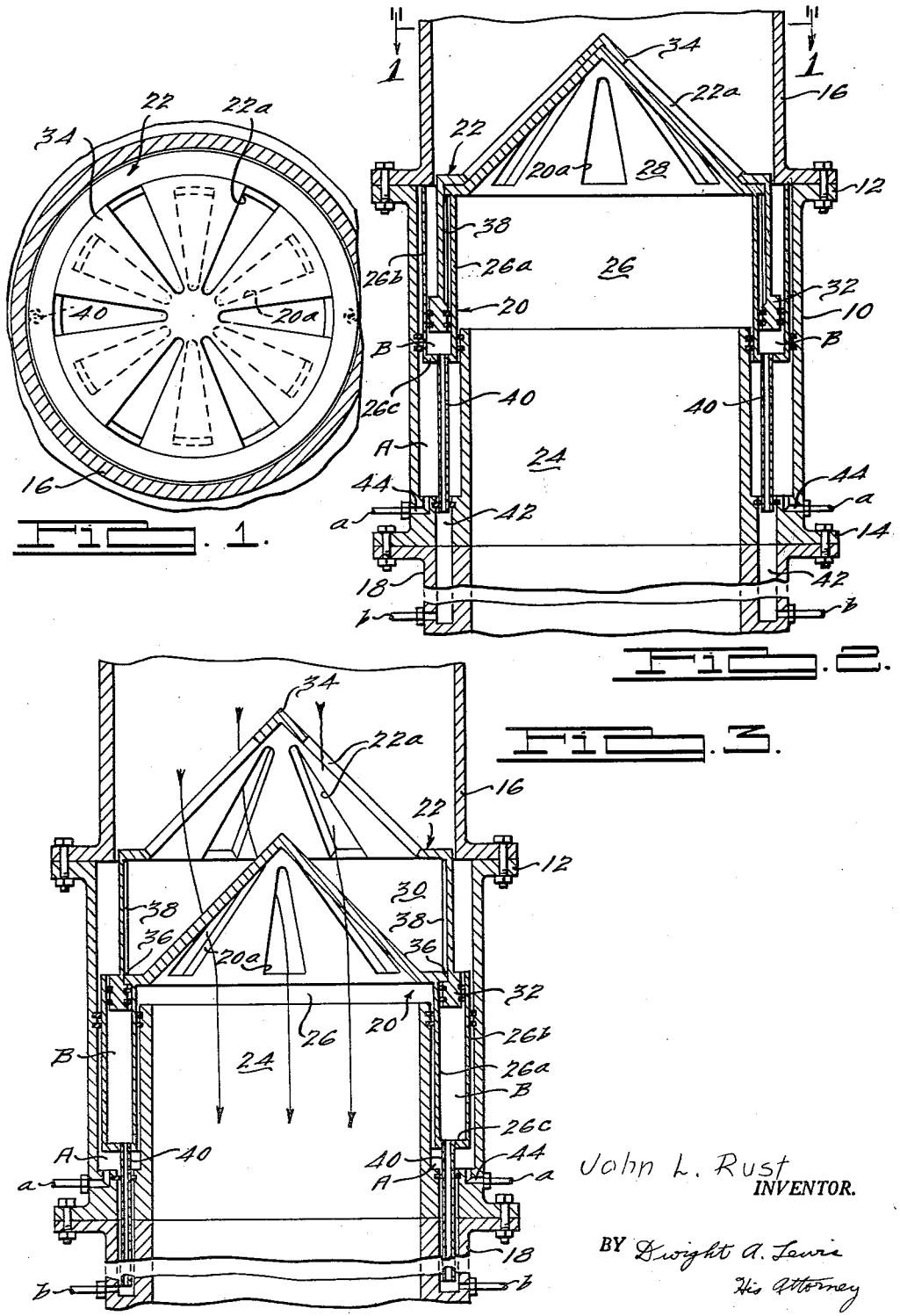

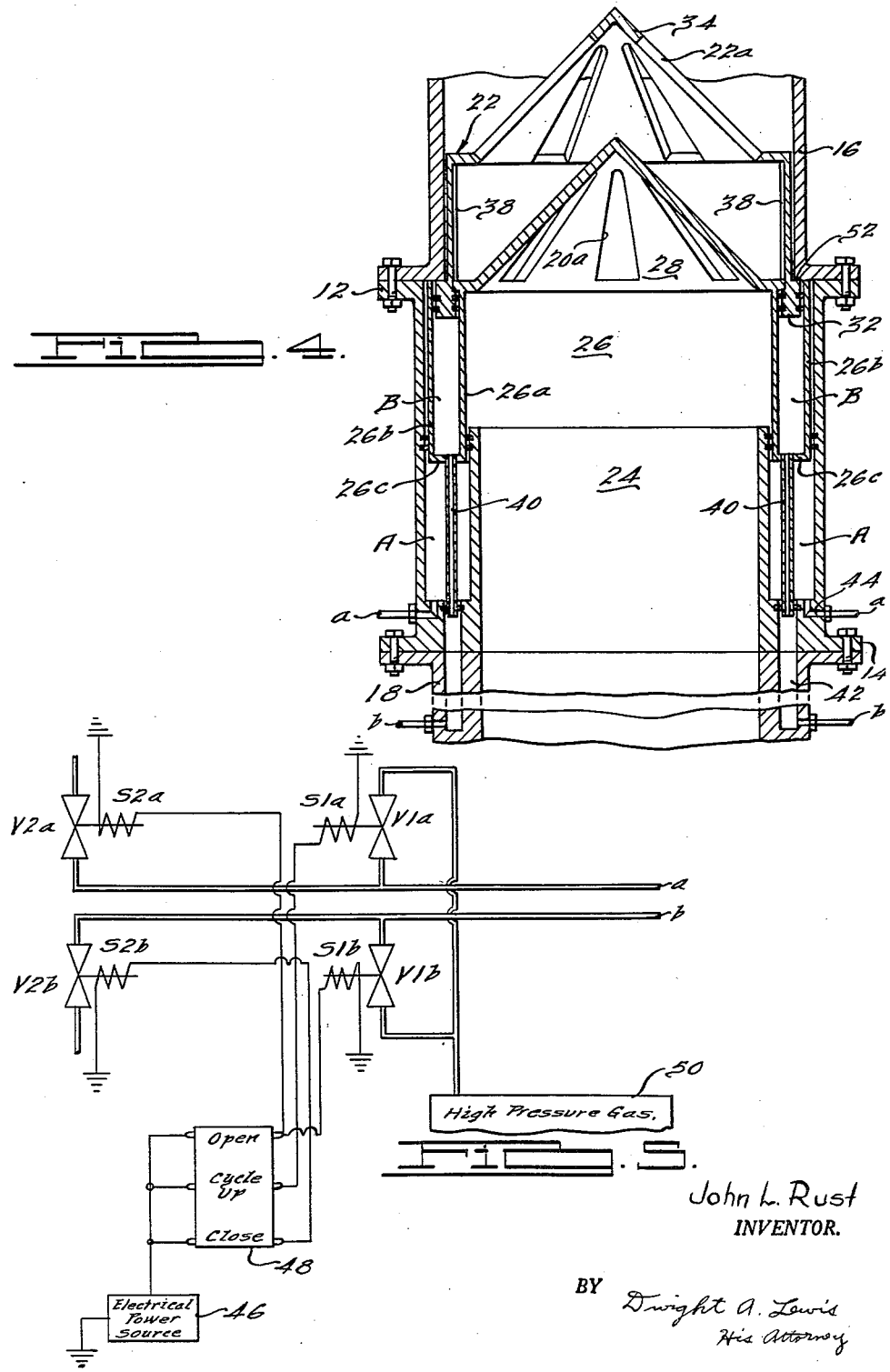

3,083,733
PRESSURE COMPENSATING VALVE
John L. Rust, Detroit, Mich., assignor to Chrysler Corporation, Highland Park, Mich., a corporation of Delaware
Filed July 1, 1960, Ser. No. 40,424
4 Claims. (Cl. 137—625.33)

The present invention relates to a pressure compensating valve, that is, a valve for fluid flow lines that compensates for the deceleration force resulting from abrupt closing of the valve thereby eliminating the hammering effect in the fluid flow line.

Prior to the present invention there have been proposed some valves having a movable valve closure member which is damped against the force of the fluid flow through the valve. However, to the best of my knowledge, there has been no prior art device that included means in the valve directly attacking the problem of the hammering effect that results from abrupt closing of a valve in a fluid flow line.

The problem encountered is that fluid flowing under pressure through a pipe builds up a certain amount of kinetic energy. When a valve in the pipe is closed abruptly, the instantaneous braking of the fluid flow results in a deceleration force being exerted on the valve similar to a hammer blow. In some fluid flow systems, such as domestic water lines, this hammering effect usually produces nothing more than an undesirable banging noise in the pipe. However, in fluid flow systems utilizing higher pressures, the hammering effect can burst the valve or the pipe lines.

The prior approach to a solution to this problem has been to construct extremely large and bulky valves in order that they may have sufficient strength to withstand this hammering. Likewise, the pipe lines must also have walls of exaggerated strength. It is, therefore, desirable to provide a valve that will enable the dissipation of the fluid deceleration force upon abrupt closing of the valve thereby preventing damage to the valve or piping.

Aside from the elimination of the hammering effect, it has long been desirable to eliminate the bulkiness of fluid flow valves. One has only to consider the complex of piping in an oil refinery wherein the various valves appear as nodes scattered along the pipes to realize the extent of this problem.

Accordingly, it is a principal object of the present invention to provide a valve for fluid flow lines that compensates for the fluid deceleration force resulting from abrupt closing of the valve.

Another object of the present invention is to provide such a valve which incorporates a cushioned valve seat effective to dissipate the fluid deceleration force upon abrupt closing of the valve.

A further object of the present invention is to provide a valve for fluid flow lines of greatly reduced dimensions as compared to prior art valves thereby minimizing the space required for installation of the valve in the lines.

A still further object of the present invention is to provide a pressure compensating valve for fluid flow lines that is operable from a remote point such as a central control system.

Another object of the present invention is to provide a pressure compensating valve for fluid flow lines which is extremely simple in construction and readily adaptable to mass production methods.

Other objects of this invention will appear in the following description and appended claims, reference being had to the accompanying drawings forming a part of this specification wherein like reference characters designate corresponding parts in the several views.

In the drawings:

FIG. 1 is an end view of a valve embodying the present invention taken along the line 1—1 of FIG. 2 in the direction of the arrows, FIG. 2 is a longitudinal sectional view of a valve embodying the present invention with the valve in its closed position, ready to open, FIG. 3 is a view similar to FIG. 2 showing the valve in its initial open position, FIG. 4 is a view similar to FIGS. 2 and 3 showing the valve in its final open position preparatory to closing, and, FIG. 5 is a schematic diagram of the control system for the valve of FIGS. 1–4.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIG. 2 of the drawings, the valve illustrated as embodying the present invention comprises a cylindrical housing 10 which may conveniently be formed with flanges 12 and 14 on either end thereof to provide means for affixing thereto cylindrical extensions 16 and 18 respectively. The distal ends (not shown) of the extensions 16 and 18 carry suitable coupling means for inserting the valve in a pipe line.

Mounted for reciprocal movement within the housing 10 are a valve seat member 20 and a valve closure member 22. As can be seen more clearly in FIGS. 1 and 3 a series of apertures 20a are provided in the valve seat member 20 in staggered relation to a series of similar apertures 22a provided in the valve closure member 22.

Thus, when the valve closure member is separated longitudinally from the valve seat member fluid can flow through the staggered apertures as shown in FIG. 3 by the arrows.

Within the cylindrical housing 10 there is provided an inner cylindrical wall 24 concentric with the housing and defining therewith an annular chamber A open at its upstream end. The inner wall 24 extends upstream from the lower end of the housing 10 for approximately half the length of the housing.

The valve seat member 20 comprises an annular base 26 mounted for reciprocal movement in chamber A. The annular base comprises an inner cylindrical wall 26a and an outer cylindrical wall 26b concentric therewith and the inner and outer walls are joined at the bottom by a bottom wall 26c. The bottom wall 26c thus forms a movable wall of chamber A. A transverse portion 28 extending across the upper end of the inner wall 26a provides the valve seat proper having the apertures 20a therein as previously described. The inner and outer walls of the annular base 26 define a second annular chamber B open at its upstream end.

The closure member 22 comprises a cylindrical base 30 having an enlarged lower edge 32 and mounted for reciprocal movement in the chamber B. A transverse portion 34 extending across the upper end of the base 30 forms the closure member proper and is provided with the apertures 22a as previously described.

In the drawings the transverse portions 28 and 34 of valve seat member 20 and valve closure member 22, respectively, i.e., the valve seat proper and closure member proper are shown to be conical. This configuration is desirable in order that the total area of each set of apertures 20a and 22a may be at least equal to, or greater than, the cross-sectional area of the lines in which the valve is installed. Thus, any throttling of the fluid flow by the valve when in its open position is prevented. It is to be understood, however, that this conical configuration is not basic to the present invention and that the valve seat proper and the closure member proper could be formed by flat discs having staggered apertures thereon or could also be hemispherical or parabolic.

Obviously, means must be provided to prevent relative rotation between the valve closure member and the valve seat member in order that lands between the apertures 20a in the valve seat may close the apertures 22a in the closure member and vice versa. For this purpose, there are provided a plurality of outward extensions 36 at the top of the inner wall 26a of the valve seat member 20 which engage in corresponding longitudinal grooves 38 provided in the base 30 of closure member 22.

In order to provide communication to chamber B, a plurality of conduits 40 extend downwardly from bottom wall 26c of the annular base 26 of the valve seat member into bores 42 that in turn extend downwardly in the wall of housing member 10 and into the wall of the bottom extension 18 a sufficient distance to provide for reciprocation of the conduits in the bores. At the bottom of each bore 42 a suitable opening through the wall of the bottom extension 18 is provided to allow coupling of conventional gas supply lines thereto.

Communication to the chamber A is provided by means of ports 44 that open outwardly through the wall of housing 10 and communicate with the bottom of the chamber. Similar gas supply lines to these ports are provided as mentioned in connection with the bores 42.

To prevent leakage of the control fluid suitable O-rings, or similar sealing means are provided at the top of bores 42, at the top of the chamber A, and carried by the enlarged portion 32 of the base 30 of closure member 22.

Referring to FIG. 5 of the drawings, there is shown schematically the control means which operates the valve. The conduit $a$ leads to the ports 44 and thus communicates with chamber A and the conduit $b$ leads to the bores 42 and thus communicates with chamber B. A source of electric power 46 is connected through a 3-position switch 48 to solenoids that control valves in the conduits $a$ and $b$. A source of high pressure gas 50, such as air or inert gas, is provided and branch lines lead from this gas source through valve V1$b$ into line $b$ and through valve V1$a$ into line $a$. Line $b$ may be vented through valve V2$b$ and, likewise, line $a$ may be vented through valve V2$a$. Each of the solenoid actuated valves is normally closed and is opened by energization of its associated solenoid.

The operation of the valve is as follows:

Beginning with the valve as shown in FIG. 2 with the base 26 of the valve seat member 20 in its uppermost position and the base 30 of the valve closure member 22 in its lowermost position, the switch 48 is placed at the "open" position. This connects the electrical power source to solenoid S1$b$ thus energizing the solenoid and opening its associated valve V1$b$ to admit gas under pressure from the high pressure gas source 50 to line $b$ and thence through bores 42 and conduits 40 to chamber B. Vent valve V2$b$ is closed because solenoid S2$b$ is not energized. At the same time electric power is also connected to solenoid S2$a$ thus opening vent valve V2$a$ thereby venting chamber A through line $a$ and ports 44. Valve V1$a$, which would admit gas under pressure to line $a$ is closed because its associated solenoid S1$a$ is not energized. The gas under pressure flowing into chamber B forces the valve seat member 20 downwardly since chamber A is vented. The valve seat member moves downwardly to the position illustrated in FIG. 3 at which time the valve is open allowing fluid to flow therethrough.

As soon as the valve is fully opened the switch 48 is then moved to the "cycle up" position. This de-energizes solenoid S1$b$ thus closing valve V1$b$ and sealing off chamber B since vent valve V2$b$ remains closed as before. At the same time, solenoid S2$a$ is de-energized thus closing valve V2$a$ and solenoid S1$a$ is energized thus opening its associated valve V1$a$ and admitting gas under pressure from the source 50 to line $a$ and thence through ports 44 to chamber A. As the gas flows into chamber A, it forces the valve seat member 20 upwards. At the same time, because gas under pressure has been sealed in chamber B, the closure member 22 is also carried upward. The two members thus move upwardly until the enlarged portion 32 of the valve closure member and the outer wall 26$b$ of the valve seat member engage against a stop 52 which may conveniently be provided by the top cylindrical extension 16 extending inwardly into the path of reciprocation of these members. The valve is then in its full open and up position as illustrated in FIG. 4.

To close the valve the switch 48 is moved to the "close" position. This de-energizes solenoid S1$a$ thus closing its associated valve V1$a$. Solenoid S2$a$ remains de-energized as before thus its associated vent valve V2$a$ remains closed. Line $a$ and, consequently, chamber A is therefore sealed off with gas under pressure retained therein. At the same time, solenoid S2$b$ is energized thus opening its associated vent valve V2$b$ allowing the gas that was sealed under pressure in chamber B to escape. Valve S1$b$ remains closed as before. The force of the liquid against the valve closure member moves closure member 22 abruptly downward until the closure member proper 34 seats firmly against the valve seat proper 28 thus closing apertures 20$a$ and 22$b$ shutting off the flow of fluid through the valve. The deceleration force of the flowing fluid is cushioned by the air retained in chamber A. That is, the initial impact after seating of the closure member forces the valve seat member 20 downward thus compressing further the gas trapped in chamber A. This increased compression results in a reaction force being exerted upwardly against the valve seat member thus deflecting the fluid deceleration force upstream into the column of fluid in the pipe line above the valve. The valve seat member will continue to oscillate in this fashion until the force is entirely dissipated and eventually comes to rest in the closed position as illustrated in FIG. 2 of the drawings.

Obviously, the pressure of gas available from the high pressure gas source 50 must be somewhat greater than the pressure of the fluid flowing through the pipe line in order that the high pressure gas may operate the valve.

From the above description, it can be seen that the valve of the present invention can be remotely controlled as the lines $a$ and $b$ may be run to any length from a central control point. Additionally, it can be appreciated from this description that a means for preventing the hammering effect that would otherwise result from abrupt closing of the valve has been provided and that the outer dimension of the valve is about the same as the pipe in which it is installed.

Having thus described my invention, I claim:

1. A pressure compensating valve for a fluid pipe line comprising: a cylindrical housing having an inner cylindrical wall defining therewith a first annular chamber open at its upstream end; a valve seat member having fluid flow passages therein and having a base portion comprised of inner and outer cylindrical walls joined by a downstream wall to define a second annular chamber opening upstream, said base portion being mounted for reciprocal movement in said first chamber with said downstream wall thereof forming a movable wall of said first chamber; a closure member operative to engage said valve seat member to close said fluid flow passages and having a cylindrical base portion mounted for reciprocal movement in said second chamber; a source of gas under pressure; a first vented conduit in communication with said first chamber and said source of gas; a second vented conduit in communication with said second chamber and said source of gas; a normally closed solenoid actuated vent valve and gas valve in each of said conduits; a source of electric power for said solenoids; and a 3-position switch between said electric power source and said solenoids, said switch operative in its first position to energize the solenoid to open the vent valve in said first conduit and to energize the solenoid controlling the gas valve in said second conduit thereby admitting gas under pressure to said second chamber to move said closure member away from said valve member; operative in its second position to de-energize the solenoids just mentioned thereby sealing gas under pressure in said second chamber and to energize the solenoid controlling the gas supply valve in said first conduit thereby admitting gas under pressure to said first chamber to force the valve seat member and the closure member therewith upstream to the full extent of expansion of said first chamber; and operative in its third position to de-energize the solenoids just mentioned thereby sealing gas under pressure in said first chamber and to energize the vent valve solenoid in said second conduit thereby venting said second chamber and allowing movement of said closure member into engagement with said valve seat member to stop fluid flow through said valve.

2. A valve as claimed in claim 1 and further characterized in that a transverse portion extends across the upstream end of said valve seat member, a similarly configured transverse portion extends across the upstream end of said closure member, and apertures are provided in each of said transverse portions whereby when said seat member and closure member are separated longitudinally fluid flows therethrough, said apertures in one portion staggered in relation to the apertures in said other portion whereby the apertures are closed by the lands therebetween when said portions engage each other.

3. A pressure compensating valve for a fluid pipe line comprising: a cylindrical housing having an inner cylindrical wall defining therewith a first annular ventable and sealable chamber open at its upstream end; a valve seat member having fluid flow passages therein and having a base portion comprised of inner and outer cylindrical walls joined by a downstream wall to define a second annular ventable and sealable chamber opening upstream, said base portion being mounted for reciprocal movement in said first chamber with said downstream wall thereof forming a movable wall of said first chamber; a closure member operative to engage said valve seat member to close said fluid flow passages and having a cylindrical base portion mounted for reciprocal movement in said second chamber; a source of pressurized gas connectible to said chambers; multiple position control means operatively connected to said chambers and operable in a first position to vent said first chamber and connect said source of pressurized gas to said second chamber to move said closure member away from said valve seat member; operable in a second position to seal gas under pressure in said second chamber and to connect said source of pressurized gas to said first chamber to force said valve seat member and said closure member therewith upstream to the full extent of expansion of said first chamber; and operable in its third position to seal gas under pressure in said first chamber and to vent said second chamber to move said closure member into engagement with said valve seat member.

4. A pressure compensating valve for a fluid pipe line comprising: a cylindrical housing having an inner cylindrical wall defining therewith a first annular, ventable and sealable chamber open at its upstream end; a valve seat member having fluid flow passages therein and having a base portion comprised of inner and outer cylindrical walls joined by a downstream wall to define a second annular, ventable and sealable chamber opening upstream, said base portion being mounted for reciprocal movement in said first chamber with said downstream wall thereof forming a movable wall of said first chamber; a closure member operative to engage said valve seat member to close said fluid flow passages and having a cylindrical base portion mounted for reciprocal movement in said second chamber; a source of pressurized gas connectible to said chambers; multiple position control means operatively connected to said chambers and operable in one position to vent said first chamber and connect said source of pressurized gas to said second chamber to move said closure member away from said valve seat member and operable in another position to seal gas under pressure in said first chamber and to vent said second chamber to move said closure member into engagement with said valve seat member.

References Cited in the file of this patent

UNITED STATES PATENTS

| | | |
|---|---|---|
| 263,731 | Shaw | Sept. 5, 1882 |
| 764,877 | Anderson | July 12, 1904 |
| 1,075,354 | Henson | Oct. 14, 1913 |
| 2,717,001 | Perrault | Sept. 6, 1955 |
| 2,740,424 | Larsen | Apr. 3, 1956 |
| 2,781,051 | Hawley | Feb. 12, 1957 |
| 2,787,376 | Coulson | Apr. 2, 1957 |
| 2,814,307 | Hafele | Nov. 26, 1957 |
| 2,938,533 | Jensen | May 31, 1960 |
| 3,007,481 | Frost | Nov. 7, 1961 |